US009333761B2

(12) United States Patent
Takagi et al.

(10) Patent No.: US 9,333,761 B2
(45) Date of Patent: May 10, 2016

(54) COLOR-PROCESSING DEVICE, IMAGE-FORMING DEVICE AND COLOR-PROCESSING METHOD

(71) Applicant: KONICA MINOLTA, INC., Chiyoda-ku (JP)

(72) Inventors: Kiyoshi Takagi, Hachioji (JP); Kenichirou Hiramoto, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/782,550

(22) PCT Filed: Apr. 15, 2014

(86) PCT No.: PCT/JP2014/060722
§ 371 (c)(1),
(2) Date: Oct. 5, 2015

(87) PCT Pub. No.: WO2014/171452
PCT Pub. Date: Oct. 23, 2014

(65) Prior Publication Data
US 2016/0039217 A1 Feb. 11, 2016

(30) Foreign Application Priority Data

Apr. 17, 2013 (JP) ................. 2013-086403

(51) Int. Cl.
*B41J 2/21* (2006.01)
(52) U.S. Cl.
CPC ..................... *B41J 2/2103* (2013.01)
(58) Field of Classification Search
CPC .......... B41J 19/147; B41J 2/07; B41J 2/2103; H04N 1/60; H04N 2201/33378; H04N 1/40087
See application file for complete search history.

(56) References Cited

U.S. PATENT DOCUMENTS 6,356,364 B2 * 3/2002 Matsushiro .......... H04N 1/6088
358/1.1

FOREIGN PATENT DOCUMENTS

| JP | 2001-310535 | 11/2001 |
|---|---|---|
| JP | 2001-352449 | 12/2001 |
| JP | 2003-295529 | 10/2003 |
| JP | 2005-199226 | 7/2005 |
| JP | 2006-270771 | 10/2006 |
| JP | 2010-64371 | 3/2010 |

\* cited by examiner

*Primary Examiner* — Thinh Nguyen
(74) *Attorney, Agent, or Firm* — Cozen O'Connor

(57) ABSTRACT

A color-processing device includes a storage section which stores reference data including reference values set for respective representative color values selected within the range of a predetermined number of gradations of a predetermined color for each of representative output parts selected from a predetermined number of output parts, a first specifying section which specifies an output part corresponding to the input value, a second specifying section which specifies a representative output part corresponding to the specified output part, a third specifying section which specifies a representative color value corresponding to a color value indicated by the input value, an obtaining section which obtains reference values corresponding to combinations of the specified representative output part and representative color value, and a calculating section which calculates an output value corresponding to the input value by interpolation using the obtained reference values.

5 Claims, 8 Drawing Sheets

| COLOR VALUE | REFERENCE DATA D | | | | | | |
|---|---|---|---|---|---|---|---|
| 255 | 0 | | | | | | 0 |
| 254 | | | | | | | |
| 253 | | | | | | | |
| 252 | | | | | | | |
| 251 | | | | | | | |
| 250 | 0 | | 1 | | 0 | | 0 |
| ... | ... | | ... | | ... | | ... |
| 10 | 0 | | 0 | | 0 | | 0 |
| 9 | | | | | | | |
| 8 | | | | g(n) | | h(n) | |
| 7 | | | | | | | |
| 6 | | | | | | | |
| 5 | 0 | | 0 | | 0 | −1 | 0 |
| 4 | | | | | | | |
| 3 | | | | g(m) | [I] | h(m) | |
| 2 | | | | | | | |
| 1 | | | | | | | |
| 0 | 0 | | 0 | | 0 | | 0 |
| NOZZLE N | x | x+1 | x+2 x+3 x+4 | x+5 | x+6 x+7 x+8 | x+9 x+10 x+11 x+12 x+13 x+14 x+15 | x+16 |
| | REPRESENTATIVE | | | | REPRESENTATIVE | | REPRESENTATIVE |

| DESIGNATED COLOR VALUE | UNCORRECTED DATA | | | | | | | | | |
|---|---|---|---|---|---|---|---|---|---|---|
| 255 | 255 | 255 | 255 | 255 | 255 | 255 | 255 | 255 | 255 | ... |
| 254 | 254 | 254 | 254 | 254 | 254 | 254 | 254 | 254 | 254 | ... |
| 253 | 253 | 253 | 253 | 253 | 253 | 253 | 253 | 253 | 253 | ... |
| 252 | 252 | 252 | 252 | 252 | 252 | 252 | 252 | 252 | 252 | ... |
| 251 | 251 | 251 | 251 | 251 | 251 | 251 | 251 | 251 | 251 | ... |
| 250 | 250 | 250 | 250 | 250 | 250 | 250 | 250 | 250 | 249 | ... |
| ⋮ | ⋮ | ⋮ | ⋮ | ⋮ | ⋮ | ⋮ | ⋮ | ⋮ | ⋮ | ⋮ |
| 10 | 10 | 10 | 10 | 10 | 10 | 10 | 10 | 10 | 10 | ... |
| 9 | 9 | 9 | 9 | 9 | 9 | 9 | 9 | 9 | 9 | ... |
| 8 | 8 | 8 | 8 | 8 | 8 | 8 | 8 | 8 | 8 | ... |
| 7 | 7 | 7 | 7 | 7 | 7 | 7 | 7 | 7 | 7 | ... |
| 6 | 6 | 6 | 6 | 6 | 6 | 6 | 6 | 6 | 6 | ... |
| 5 | 5 | 5 | 5 | 5 | 5 | 5 | 5 | 5 | 6 | ... |
| 4 | 4 | 4 | 4 | 4 | 4 | 4 | 4 | 4 | 4 | ... |
| 3 | 3 | 3 | 3 | 3 | 3 | 3 | 3 | 3 | 3 | ... |
| 2 | 2 | 2 | 2 | 2 | 2 | 2 | 2 | 2 | 2 | ... |
| 1 | 1 | 1 | 1 | 1 | 1 | 1 | 1 | 1 | 1 | ... |
| 0 | 0 | 0 | 0 | 0 | 0 | 0 | 0 | 0 | 0 | ... |
| NOZZLE $N$ | x | x+1 | x+2 | x+3 | x+4 | x+5 | x+6 | x+7 | x+8 | ... |

FIG.4B

| DESIGNATED COLOR VALUE | COLOR SAMPLE DATA | | | | | | | | | |
|---|---|---|---|---|---|---|---|---|---|---|
| 255 | 255 | 255 | 255 | 255 | 255 | 255 | 255 | 255 | 255 | ... |
| 254 | 254 | 254 | 254 | 254 | 254 | 254 | 254 | 254 | 254 | ... |
| 253 | 253 | 253 | 253 | 253 | 253 | 253 | 253 | 253 | 253 | ... |
| 252 | 252 | 252 | 252 | 252 | 252 | 252 | 252 | 252 | 252 | ... |
| 251 | 251 | 251 | 251 | 251 | 251 | 251 | 251 | 251 | 251 | ... |
| 250 | 250 | 250 | 250 | 250 | 250 | 250 | 250 | 250 | 250 | ... |
| ⋮ | ⋮ | ⋮ | ⋮ | ⋮ | ⋮ | ⋮ | ⋮ | ⋮ | ⋮ | ⋮ |
| 10 | 10 | 10 | 10 | 10 | 10 | 10 | 10 | 10 | 10 | ... |
| 9 | 9 | 9 | 9 | 9 | 9 | 9 | 9 | 9 | 9 | ... |
| 8 | 8 | 8 | 8 | 8 | 8 | 8 | 8 | 8 | 8 | ... |
| 7 | 7 | 7 | 7 | 7 | 7 | 7 | 7 | 7 | 7 | ... |
| 6 | 6 | 6 | 6 | 6 | 6 | 6 | 6 | 6 | 6 | ... |
| 5 | 5 | 5 | 5 | 5 | 5 | 5 | 5 | 5 | 5 | ... |
| 4 | 4 | 4 | 4 | 4 | 4 | 4 | 4 | 4 | 4 | ... |
| 3 | 3 | 3 | 3 | 3 | 3 | 3 | 3 | 3 | 3 | ... |
| 2 | 2 | 2 | 2 | 2 | 2 | 2 | 2 | 2 | 2 | ... |
| 1 | 1 | 1 | 1 | 1 | 1 | 1 | 1 | 1 | 1 | ... |
| 0 | 0 | 0 | 0 | 0 | 0 | 0 | 0 | 0 | 0 | ... |
| NOZZLE $N$ | x | x+1 | x+2 | x+3 | x+4 | x+5 | x+6 | x+7 | x+8 | ... |

FIG.5A

| DESIGNATED COLOR VALUE | UNCORRECTED DATA | | | | | | | | | |
|---|---|---|---|---|---|---|---|---|---|---|
| 255 | 255 | | | | | | | | 255 | ... |
| 254 | | | | | | | | | | |
| 253 | | | | | | | | | | |
| 252 | | | | | | | | | | |
| 251 | | | | | | | | | | |
| 250 | 250 | | | | | | | | 249 | ... |
| ⋮ | ⋮ | | | | | | | | ⋮ | ⋮ |
| 10 | 10 | | | | | | | | 10 | ... |
| 9 | | | | | | | | | | |
| 8 | | | | | | | | | | |
| 7 | | | | | | | | | | |
| 6 | | | | | | | | | | |
| 5 | 5 | | | | | | | | 6 | ... |
| 4 | | | | | | | | | | |
| 3 | | | | | | | | | | |
| 2 | | | | | | | | | | |
| 1 | | | | | | | | | | |
| 0 | 0 | | | | | | | | 0 | ... |
| NOZZLE N | x | x+1 | x+2 | x+3 | x+4 | x+5 | x+6 | x+7 | x+8 | ... |

FIG.5B

| DESIGNATED COLOR VALUE | COLOR SAMPLE DATA | | | | | | | | | |
|---|---|---|---|---|---|---|---|---|---|---|
| 255 | 255 | | | | | | | | 255 | ... |
| 254 | | | | | | | | | | |
| 253 | | | | | | | | | | |
| 252 | | | | | | | | | | |
| 251 | | | | | | | | | | |
| 250 | 250 | | | | | | | | 250 | ... |
| ⋮ | ⋮ | | | | | | | | ⋮ | ⋮ |
| 10 | 10 | | | | | | | | 10 | ... |
| 9 | | | | | | | | | | |
| 8 | | | | | | | | | | |
| 7 | | | | | | | | | | |
| 6 | | | | | | | | | | |
| 5 | 5 | | | | | | | | 5 | ... |
| 4 | | | | | | | | | | |
| 3 | | | | | | | | | | |
| 2 | | | | | | | | | | |
| 1 | | | | | | | | | | |
| 0 | 0 | | | | | | | | 0 | ... |
| NOZZLE N | x | x+1 | x+2 | x+3 | x+4 | x+5 | x+6 | x+7 | x+8 | ... |

FIG.6

| COLOR VALUE | REFERENCE DATA $D$ | | | | | | | | |
|---|---|---|---|---|---|---|---|---|---|
| 255 | 0 | | | | | | | 0 | ... |
| 254 | | | | | | | | | |
| 253 | | | | | | | | | |
| 252 | | | | | | | | | |
| 251 | | | | | | | | | |
| 250 | 0 | | | | | | | 1 | ... |
| ⋮ | ⋮ | | | | | | | ⋮ | ⋮ |
| 10 | 0 | | | | | | | 0 | ... |
| 9 | | | | | | | | | |
| 8 | | | | | | | | | |
| 7 | | | | | | | | | |
| 6 | | | | | | | | | |
| 5 | 0 | | | | | | | −1 | ... |
| 4 | | | | | | | | | |
| 3 | | | | | | | | | |
| 2 | | | | | | | | | |
| 1 | | | | | | | | | |
| 0 | 0 | | | | | | | 0 | ... |
| NOZZLE $N$ | x | x+1 | x+2 | x+3 | x+4 | x+5 | x+6 | x+7 | x+8 | ... |

COLOR-PROCESSING DEVICE, IMAGE-FORMING DEVICE AND COLOR-PROCESSING METHOD

RELATED APPLICATIONS

This is a U.S. National Phase Application under 35 USC 371 of International Application PCT/JP2014/060722 filed on Apr. 15, 2014.

This application claims the priority of Japanese application no. 2013-086403 filed Apr. 17, 2013, the entire

TECHNICAL FIELD

The present invention relates to a color-processing device, an image-forming device, and a color-processing method.

BACKGROUND ART

In devices performing color output, such as an image-forming device, a difference may occur between the color value of a color indicated by information such as image-forming signals and the color value of the color reproduced as the result of output based on the information, due to individual variability and any other factor. Preferably, the difference between the color values should be eliminated since it impairs the reproducibility of colors of an output result relative to expected colors of the image. A color-processing device is known that corrects the color value indicated by signals using reference data for matching the signals with the result of the output to match the color value indicated by signals with the output color value (See Patent Literature 1, for example).

Prior Art Literatures

Patent Literatures

Patent Literature 1: Japanese Unexamined Patent Application Publication No. 2006-270771

DISCLOSURE OF INVENTION

Problems to be Solved by the Invention

Unfortunately, if there are a plurality of structures for color output, a conventional color-processing device requires reference data for each of the structures individually.

For example, a conventional color-processing device mounted in an ink-jet image-forming device requires individual reference data for each of a plurality of nozzles for ejecting ink. This requires a large storage capacity of a storage device for storing the reference data, resulting in increased cost, for example.

An object of the present invention is to provide a color-processing device, an image-forming device, and a color-processing method with reduced volume of reference data.

Means for Solving Problems

One aspect of the present invention, referred to as item 1, is a color-processing device for correcting a color value of a predetermined color to be output from any of a predetermined number of output parts based on an input value, wherein the output parts are arranged in a predetermined direction and the predetermined number is three or more, the device including: a storage section which stores reference data including a plurality of reference values set for a plurality of respective representative color values for each of a plurality of representative output parts, wherein the representative output parts are selected from the predetermined number of output parts, the number of the representative output parts is less than the predetermined number, the representative color values are selected within a range of a predetermined number of gradations from a minimum color value to a maximum color value of the predetermined color, and the number of the representative color values is less than the predetermined number of the gradations; a first specifying section which specifies an output part corresponding to the input value; a second specifying section which specifies, from among the representative output parts, a representative output part corresponding to the output part specified by the first specifying section; a third specifying section which specifies a representative color value corresponding to a color value indicated by the input value; an obtaining section which obtains, from the storage section, the reference values corresponding to combinations of the representative output part specified by the second specifying section and the representative color value specified by the third specifying section; and a calculating section which calculates an output value corresponding to the input value by interpolation using the reference values obtained by the obtaining section.

An embodiment of the present invention, referred to as item 2, is the color-processing device according to item 1, wherein if the output part specified by the first specifying section is one of the representative output parts, the second specifying section specifies one representative output part, which is the output part specified by the first specifying section, and if the output part specified by the first specifying section is none of the representative output parts, the second specifying section specifies two representative output parts adjacent to the output part specified by the first specifying section; and if the color value indicated by the input value is one of the representative color values, the third specifying section specifies one representative color value, which is the color value indicated by the input value, and if the color value indicated by the input value is none of the representative color values, the third specifying section specifies two representative color values approximate to the color value indicated by the input value.

An embodiment of the present invention, referred to as item 3, is the color-processing device according to item 1 or 2, wherein the reference values are set based on results of comparisons between output results corresponding to the representative color values of the predetermined color output from the representative output parts, and color samples corresponding to the representative color values of the predetermined color.

Another aspect of the present invention, referred to as item 4, is an image-forming device that includes a predetermined number of nozzles for ejecting ink, the nozzles being arranged in a predetermined direction; a generating section which generates an input value for ejecting the ink from any of the predetermined number of nozzles based on image data; and the color-processing device according to any one of items 1 to 3, wherein the color-processing device corrects the color value of the predetermined color to be output from any of the predetermined number of nozzles based on the input value generated by the generating section, wherein the predetermined number of nozzles are arranged in the predetermined direction, the predetermined number is three or more, and the predetermined number of nozzles are the predetermined number of output parts.

Another aspect of the present invention, referred to as item 5 is a color-processing method for correcting a color value of a predetermined color to be output from any of a predetermined number of output parts based on an input value, wherein the output parts are arranged in a predetermined direction and the predetermined number is three or more, the method including: creating reference data including a plurality of reference values set for a plurality of respective representative color values for each of a plurality of representative output parts, wherein the representative output parts are selected from the predetermined number of output parts, the number of the representative output parts is less than the predetermined number, the representative color values are selected within a range of a predetermined number of gradations from a minimum color value to a maximum color value of the predetermined color, and the number of the representative color values is less than the predetermined number of the gradations; specifying an output part corresponding to the input value; specifying, from among the representative output parts, representative output parts corresponding to the specified output part corresponding to the input value; specifying representative color values corresponding to a color value indicated by the input value; obtaining the reference values corresponding to combinations of the two specified representative output parts and the two specified representative color values; and calculating an output value corresponding to the input value by interpolation using the obtained reference values.

Effects of the Invention

The present invention can reduce volume of reference data.

EMBODIMENT TO CARRY OUT THE INVENTION

An embodiment of the present invention will be described with reference to the drawings. Although the embodiment described below has various limitations that are technically preferable in implementing the present invention, the scope of the present invention should not be limited to the following embodiment and illustrated examples.

Figure 1:
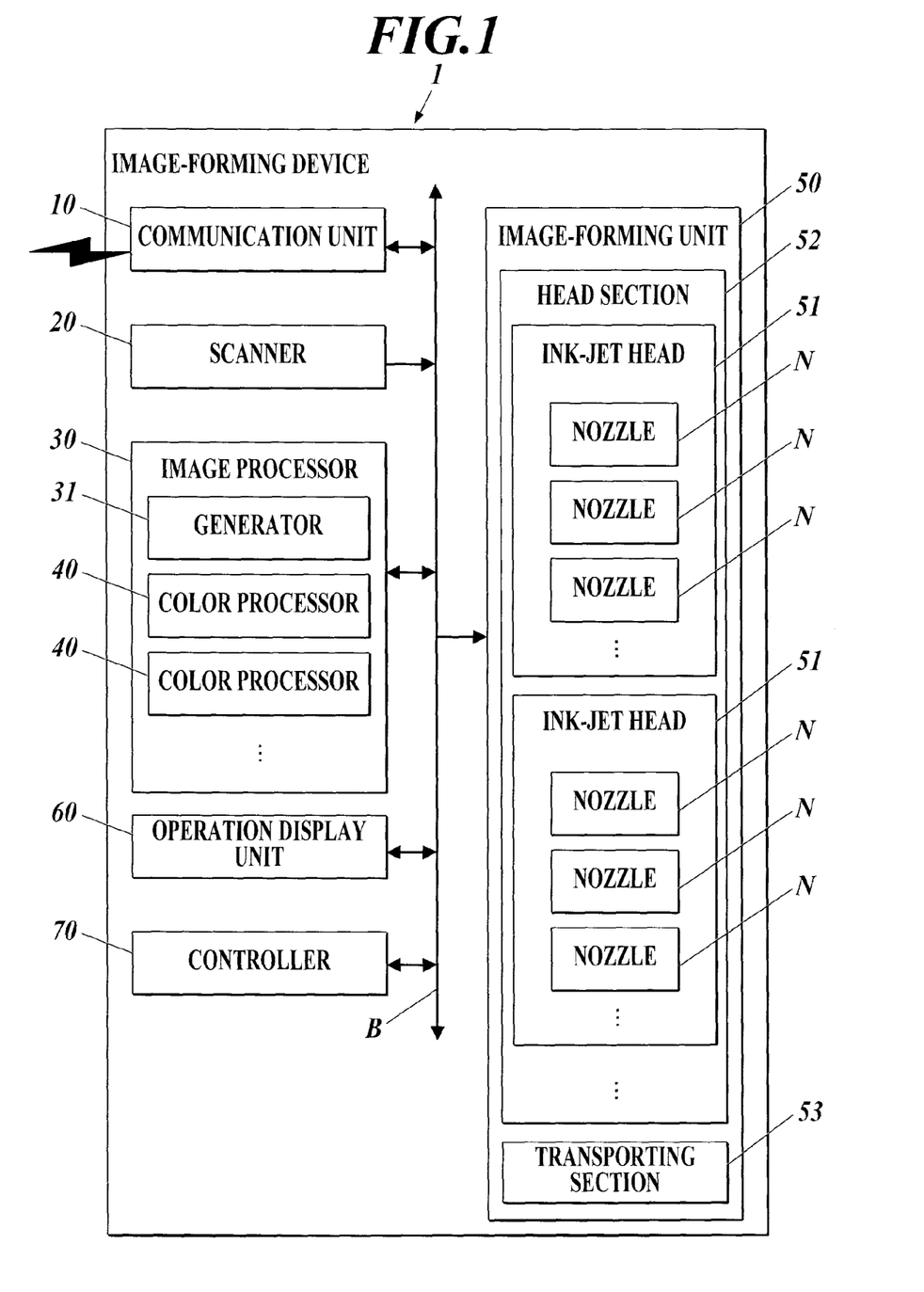
FIG. 1 is a block diagram illustrating a main structure of an image-forming device according to an embodiment of the present invention.

FIG. 1 is a block diagram illustrating a main structure of an image-forming device 1 according to an embodiment of the present invention.

The image-forming device 1 includes a communication unit 10, a scanner 20, an image processor 30, an image-forming unit 50, an operation display unit 60, and a controller 70. These components of the image-forming device 1 are connected to each other via a bus B. The image-forming device 1 of the present embodiment is an ink-jet image-forming device provided with a plurality of nozzles N that eject ink on a recording medium to form an image.

The communication unit 10 includes a network interface card, for example, to communicatively connect the image-forming device 1 with an external device (not shown).

The communication unit 10 obtains image data sent from the external device, for example.

The scanner 20 includes an imaging device, such as a charge-coupled device (CCD) image sensor and a complementary metal oxide semiconductor (CMOS) image sensor, for example, to scan an image and generate the image data.

The image processor 30 performs various image processing operations on the image data.

Specifically, the image processor 30 includes a generator 31 and color processors 40.

The generator 31 functions as a generating section which generates an input value from the image data. Based on the input value, one of a predetermined number of nozzles N of the image-forming unit 50 ejects ink.

Each of the color processors 40 corrects the color value of a predetermined color to be output from a nozzle N of the image-forming unit 50 based on the input value generated by the generator 31.

The color processor 40 corrects the color value indicated by the input value generated by the generator 31 in the image processor 30, and the image processor 30 outputs an output value including the corrected color value to the image-forming unit 50.

The image processor 30 may also include various structures for image processing, such as a color converter which converts the color space of image data into the color space to be handled by the image-forming device 1, for example, other than the color processor 40.

The image-forming unit 50 forms an image corresponding to the image data on a recording medium.

Specifically, the image-forming unit 50 includes a head section 52 having ink-jet heads 51 each of which ejects ink of a predetermined color from a predetermined number (three or more) of nozzles N arranged in a predetermined direction, and a transporting section 53 for transporting a recording medium, such as a sheet of paper, in the direction orthogonal to the predetermined direction relative to the head section 52, for example. The image-forming unit 50 of the present embodiment adopts a single-pass printing scheme that involves ejection of ink through the nozzles N of the ink-jet heads 51 fixed at a predetermined position onto a recording medium transported by the transporting section 53 to form an image.

The image-forming unit 50 of the present embodiment forms an image by combinations of a plurality of color inks.

Specifically, the head section 52 of the image-forming unit 50 includes a plurality of ink-jet heads 51 for the respective different colors. The image processor 30 includes a plurality of color processors 40 for the respective different colors.

The image-forming unit 50 of the present embodiment can simultaneously perform image formation in a plurality of lines.

Specifically, the head section 52 of the image-forming unit 50 includes a plurality of ink-jet heads 51 for the respective colors. The heads 51 are arranged in a direction in which a recording medium is transported. The image processor 30 includes a plurality of color processors 40 for the respective ink-jet heads 51 for the respective colors.

The operation display unit 60 displays various outputs on the operations of the image-forming device 1, and detects various input operations on the operations of the image-forming device 1.

Specifically, the operation display unit 60 includes a display device having a touch-panel input unit, or switches for various input operations, for example. The operation display unit 60 displays various outputs on the operations of the image-forming device 1 on the display device under control of the controller 70. The operation display unit 60 also detects user input operations on the touch-panel input unit or the switches, and outputs signals of the detected input operations to the controller 70.

The controller 70 performs various processes on the control of the operations of the image-forming device 1.

Specifically, the controller 70 includes a CPU, a RAM, and a ROM, for example. The CPU reads programs and data for performing processes from a storage device, such as a ROM, and processes them to control the operations of the components of the image-forming device 1. The CPU also makes the RAM store the programs and data read in the processes and parameters generated in the processes.

The controller 70 outputs image data obtained through the communication unit 10 or the scanner 20, for example, to the image processor 30, so that the image processor 30 performs image processing operations. The controller 70 makes the image-forming unit 50 operate based on output values from the image processor 30.

Figure 2:
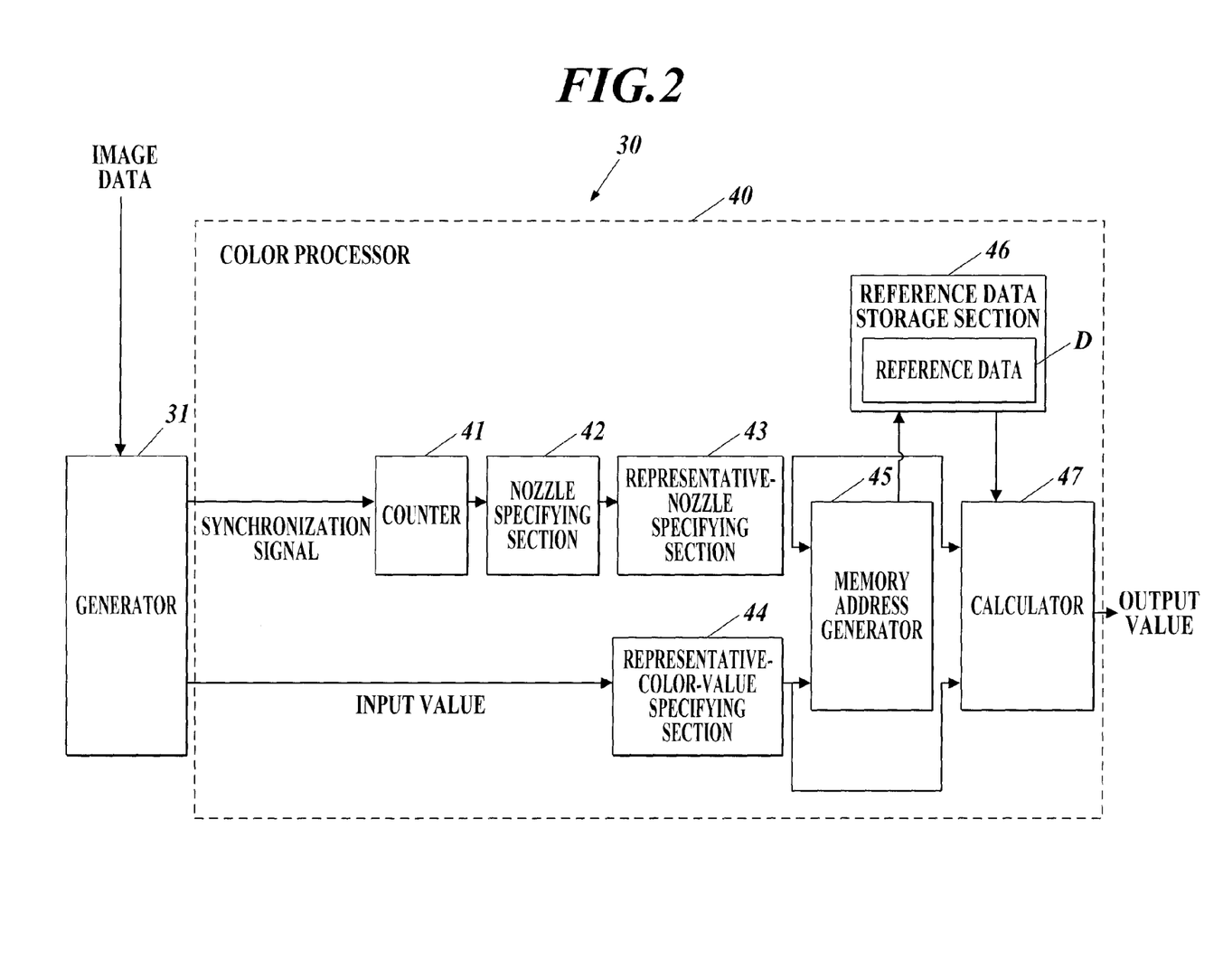
FIG. 2 is a block diagram illustrating an example structure of an image processor.

With reference to FIG. 2, the generator 31 and the color processors 40 of the image processor 30 will now be described.

The generator 31 generates input values indicating color values of a plurality of colors to be handled by the plurality of ink-jet heads 51 of the image-forming unit 50, based on color values set for a plurality of pixels constituting image data. The generator 31 generates input values according to colors for the color processors 40 for the respective colors.

The generator 31 also generates a synchronization signal at the same time as an output timing of an input value. The generator 31 outputs an input value and a synchronization signal for each of the color processors 40.

The input value and synchronization signal are input to the color processor 40.

The color processor 40 operates based on the input value and synchronization signal output from the generator 31, and outputs an output value. A single color processor 40 corresponding to a predetermined color will be described hereinafter. Actually, however, a plurality of color processors 40 corresponding to the respective ink-jet heads 51 perform processing for the ink-jet heads 51 provided for the respective colors.

Specifically, as shown in FIG. 2, the color processor 40 includes a counter 41, a nozzle specifying section 42, a representative-nozzle specifying section 43, a representative-color-value specifying section 44, a memory address generator 45, a reference data storage section 46, and a calculator 47.

The color processor 40 includes an integrated circuit (IC), such as a field-programmable gate array (FPGA) and an application specific integrated circuit (ASIC), for example. The IC has functions of the components constituting the generator 31 and the color processor 40.

The counter 41 counts the outputs of synchronization signals.

The nozzle specifying section 42 specifies a nozzle N corresponding to the input value from among a predetermined number of nozzles N of the ink-jet head 51 for a color corresponding to the color processor 40 including the nozzle specifying section 42, based on the number of outputs of synchronization signals counted by the counter 41.

Figure 3:
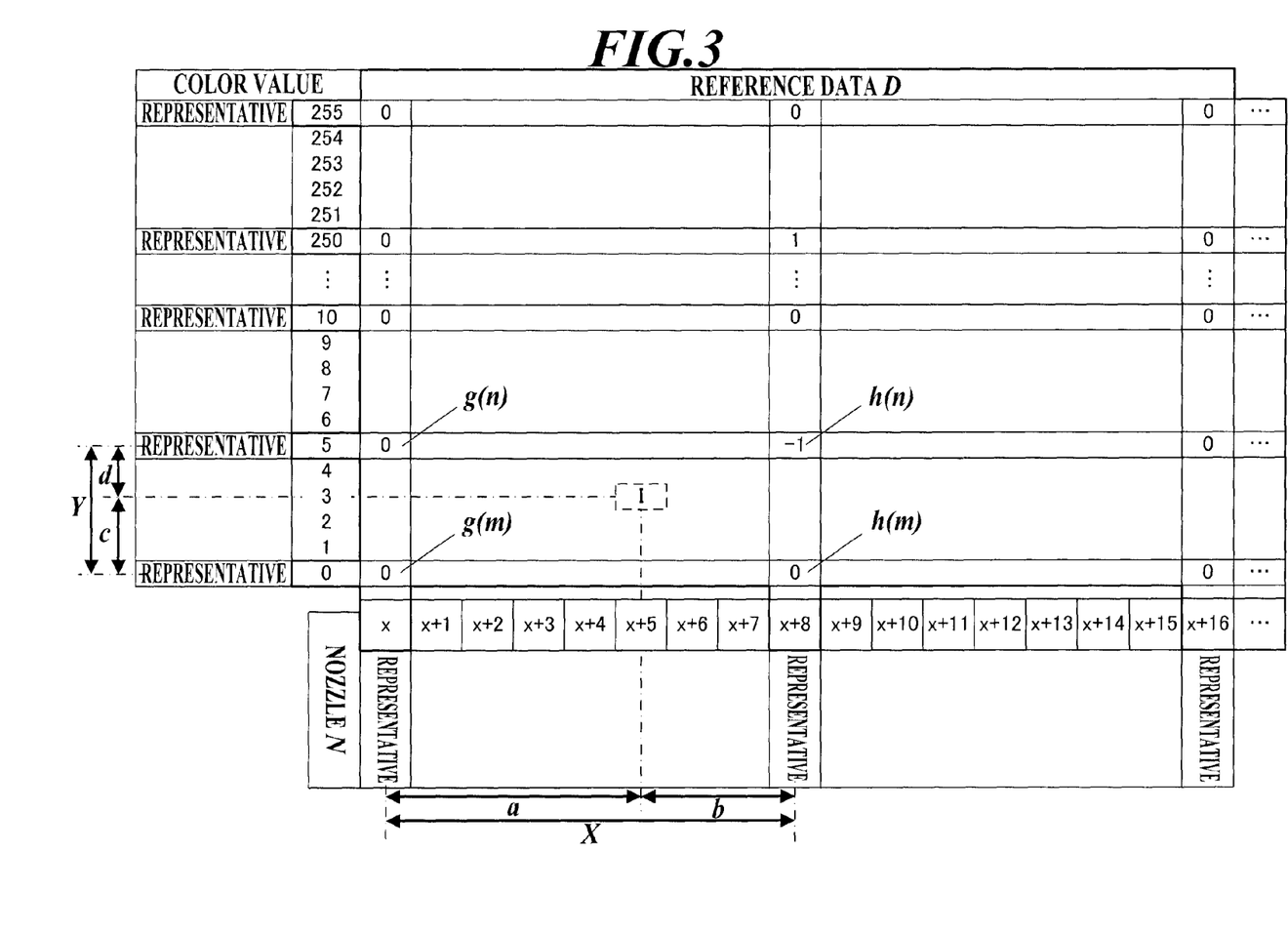
FIG. 3 is a diagram illustrating example reference data and a correspondence relationship between input values related to calculations of output values using the reference data, and reference values.

Specifically, if the counter 41 counts the output of one synchronization signal, the nozzle specifying section 42 determines that the input value output together with the one synchronization signal is for the leftmost nozzle N(x) in the predetermined number of nozzles N arranged in the predetermined direction shown in FIG. 3. If the counter 41 counts the outputs of two synchronization signals, the nozzle specifying section 42 determines that the input value output together with the second synchronization signal is for the second nozzle N(x+1) from the left in the predetermined number of nozzles N. For the third and sequent synchronization signals, the nozzle specifying section 42 specifies a nozzle N corresponding to an input value based on the number of outputs of synchronization signals counted by the counter 41 in the same manner.

The counter 41 in cooperation with the nozzle specifying section 42 functions as a first specifying section which specifies an output part (a nozzle N) corresponding to an input value generated by the generator 31.

The representative-nozzle specifying section 43 specifies a representative nozzle(s) corresponding to the nozzle N specified by the nozzle specifying section 42.

Specifically, the representative-nozzle specifying section 43 specifies a representative nozzle(s) corresponding to the nozzle N specified by the nozzle specifying section 42 from among the representative nozzles for which reference values are set in reference data D stored in the reference data storage section 46. The representative-nozzle specifying section 43 functions as a second specifying section.

With reference to FIG. 3, reference data D will now be described.

Reference data D includes reference values set for the respective representative color values for each of the representative output parts (for example, the representative nozzles). The representative output parts are selected from a predetermined number of output parts (for example, nozzles N), and the number of the representative output parts is two or more and less than the predetermined number. The representative color values are selected within the range of a predetermined number of gradations of a predetermined color from the minimum color value to the maximum color value, and the number of the representative color values is two or more and less than the predetermined number of gradations.

Specifically, as shown in FIG. 3, reference data D includes reference values corresponding to the respective representative color values of a color corresponding to the color processor 40 including the reference data storage section 46 which stores the reference data D. The representative color values are selected within the range of a predetermined number of gradations (e.g. 256) of the color from the minimum color value (e.g. 0) to the maximum color value (e.g. 255). The number of the representative color values is two or more and less than the predetermined number of gradations. In the reference data D as an example shown in FIG. 3, color values are periodically selected as representative color values within the range of color values from 0 to 255 at a predetermined color value interval (e.g. of 5) in a manner such as 0, 5, 10, . . . , 250, and 255, and the reference values are set for the representative color values and are not set for the other color values. However, this example is a mere example of selection of the representative color values for which the reference values are set. This example is not limitative and can be appropriately modified. For example, the periodical selection of color values as representative color values may be partially or totally changed to an aperiodic one.

The reference values are set for the representative nozzles. The representative nozzles are periodically selected from among a predetermined number of nozzles N arranged in a predetermined direction at a predetermined nozzle interval (e.g. of 8) in a matter such as (x), (x+8), (x+16), ... from the left. The number of the representative nozzles is two or more and less than the predetermined number of nozzles N. The representative nozzles N are the nozzles N of the ink-jet head 51 corresponding to the color processor 40 including the reference data storage section 46 which stores the reference data D. In an example shown in FIG. 3, although description after (x+16) is omitted, reference values are also set for the representative nozzles periodically selected at the predetermined nozzle interval (e.g. of 8) after (x+16) in the reference data D, in the same manner as the nozzles N(x), N(x+8), and N(x+16). The periodical selection of the representative nozzles in the reference data D shown in FIG. 3 is a mere example and not limitative. The periodical selection of representative nozzles can be appropriately modified similarly to the periodical selection of the representative color values described above. Preferably, the representative color values and the representative nozzles are selected to include both ends from the perspective of easiness of complement for thinned-out parts near the both ends of the color values and nozzles. For the same reason, the representative nozzles are preferably selected to include both end nozzles.

In the present embodiment, the representative color values include the minimum color value and the maximum color value, and the representative nozzles include the nozzles (x) and (x+a predetermined number −1).

Reference values are used for correction of the representative color values when the nozzles N selected as the representative output parts (e.g. the representative nozzles) output the color values selected as the representative color values.

For example, in an example shown in FIG. 3, for the nozzle N(x), a reference value of 0 is set for a representative color value of 5. This shows that, when the nozzle N(x) outputs an output of a color value of 5, the reference value for the color value is 0. That is, the nozzle N(x) outputs the output corresponding to a color value of 5 without correction. For the nozzle N(x+8), a reference value of −1 is set for a representative color value of 5. This shows that, when the nozzle N(x+8) outputs an output of a color value of 5, the reference value for the color value is −1. Such a correction using the reference value of −1 intends to produce an output corresponding to a color value of 5 when the nozzle N(x+8) outputs an output based on the input value corresponding to a color value of 5. This is based on a measurement result that, without the correction using the reference value, an output corresponding to a color value of 6 is produced.

The representative-nozzle specifying section 43 may store information on which nozzles of all nozzles correspond to the representative nozzles, or obtain the information from reference data D. For example, based on the information, the representative-nozzle specifying section 43 specifies two nozzles N adjacent to a nozzle N specified by the nozzle specifying section 42, from among a plurality of nozzles N set as the representative nozzles in reference data D, as two representative nozzles corresponding to the nozzle N specified by the nozzle specifying section 42.

Specifically, as a first nozzle, the representative-nozzle specifying section 43 specifies the representative nozzle nearest to a nozzle N specified by the nozzle specifying section 42 in one direction (for example, left in FIG. 3) along the direction in which a predetermined number of nozzles N are arranged, from among two or more representative nozzles N. As a second nozzle, the representative-nozzle specifying section 43 specifies the representative nozzle nearest to the nozzle N specified by the nozzle specifying section 42 in the other direction (for example, right in FIG. 3) along the direction in which the predetermined number of nozzles N are arranged, from among the two or more representative nozzles N.

For example, if the nozzle N specified by the nozzle specifying section 42 is the nozzle N(x+5) shown in FIG. 3, the representative-nozzle specifying section 43 specifies the nozzle N(x) as a first nozzle, and the nozzle N(x+8) as a second nozzle, from among the nozzles N(x), N(x+8), N(x+16), ..., which are the representative nozzles.

If the nozzle N specified by the nozzle specifying section 42 is one of the representative nozzles N, the representative-nozzle specifying section 43 specifies the nozzle N as a first nozzle and omits to specify a second nozzle.

As described, if an output part (a nozzle) specified by the first specifying section (the nozzle specifying section 42) is one of the representative output parts (the representative nozzles), the second specifying section (the representative-nozzle specifying section 43) specifies the one representative output part, which is the output part specified by the first specifying section. If an output part specified by the first specifying section is none of the representative output parts, the second specifying section specifies two representative output parts adjacent to the output part specified by the first specifying section.

The representative-color-value specifying section 44 functions as a third specifying section which specifies a representative color value(s) corresponding to a color value indicated by an input value.

Specifically, for example, the representative-color-value specifying section 44 specifies the representative color value closest to a color value indicated by an input value, as a first color value, from among the representative color values equal to or smaller than the color value indicated by the input value. The representative-color-value specifying section 44 also specifies the representative color value closest to the color value indicated by the input value, as a second color value, from among the representative color values equal to or larger than the color value indicated by the input value. The representative-color-value specifying section 44 may store information on which color values correspond to the representative color values within the range of a predetermined number of gradations from the minimum color value to the maximum color value, or obtain the information from reference data D.

If the color value indicated by the input value is 3, the representative-color-value specifying section 44 specifies a representative color value of 0 as a first color value, and specifies a representative color value of 5 as a second color value, from among the representative color values of 0, 5, 10, ..., 250, and 255 shown in FIG. 3.

If the color value indicated by the input value is one of the representative color values, the representative-color-value specifying section 44 specifies the indicated color value as a first color value and omits to specify a second color value.

As described, if the color value indicated by the input value is one of the representative color values, the third specifying section (the representative-color-value specifying section 44) specifies the one representative color value, which is the color value indicated by the input value. If the color value indicated by the input value is none of the representative color values, the third specifying section specifies two representative color values approximate to the color value indicated by the input value.

The memory address generator 45 generates a memory address(es) used for obtaining a reference value(s) corresponding to a combination (s) of a representative nozzle(s) specified by the representative-nozzle specifying section 43 and a representative color value(s) specified by the representative-color-value specifying section 44.

For example, if the representative-nozzle specifying section 43 specifies first and second nozzles and the representative-color-value specifying section 44 specifies first and second color values, the memory address generator 45 generates memory addresses used for reading four reference values from the reference data storage section 46. The four reference values are set for the first and second nozzles specified by the representative-nozzle specifying section 43 and for the first and second color values specified by the representative-color-value specifying section 44, in a plurality of reference values set in reference data D. If the representative-nozzle specifying section 43 specifies only a first nozzle, the memory address generator 45 generates memory addresses used for reading reference values set for the first nozzle from the reference data storage section 46. If the representative-color-value specifying section 44 specifies only a first color value, the memory address generator 45 generates memory addresses used for reading reference values set for the first color value from the reference data storage section 46.

The reference data storage section 46 functions as a storage section which stores reference data D. The reference data storage section 46 outputs reference values corresponding to memory addresses generated by the memory address generator 45 to the calculator 47. The calculator 47 obtains the output reference values. The calculator 47 in cooperation with the memory address generator 45 functions as an obtaining section which obtains a reference value(s) corresponding to the combination(s) of a representative nozzle(s) specified by the representative-nozzle specifying section 43 and a representative color value(s) specified by the representative-color-value specifying section 44.

The calculator 47 functions as a calculating section which calculates an output value corresponding to the input value by interpolation using the obtained reference values.

Specifically, the calculator 47 corrects the color value indicated by the input value by bilinear interpolation using the reference values obtained in accordance with the memory addresses generated by the memory address generator 45 as shown in the following formula (1), and calculates a corrected color value as an output value O. In formula (1), I denotes the color value indicated by an input value; X denotes an interval (e.g. X=8) of the representative nozzles based on the predetermined number of thinned-out nozzles; Y denotes an interval (e.g. Y=5) of the representative color values based on the predetermined number of thinned-out color values; a denotes an interval between the nozzle N corresponding to the input value and a first nozzle in the interval of the representative nozzles; b denotes an interval between the nozzle N corresponding to the input value and a second nozzle in the interval of the representative nozzles; c denotes the difference between the color value indicated by the input value and a first color value in the interval of the representative color values; d denotes the difference between the color value indicated by the input value and a second color value in the interval of the representative color values; g denotes the first nozzle; h denotes the second nozzle; m denotes the reference value corresponding to the first color value; and n denotes the reference value corresponding to the second color value. For example, a value as shown in g(m) denotes the reference value corresponding to the first color value (m) of the first nozzle (g).

[Formula 1]

$$O = I + \frac{g(m)(X-a)(Y-c) + g(n)(X-a)(Y-d) + h(m)(X-b)(Y-c) + h(n)(X-b)(Y-d)}{X \times Y} \quad (1)$$

For example, as shown in FIG. 3, if the nozzle N specified by the nozzle specifying section 42 is the nozzle N(x+5) and the color value indicated by an input value is 3, the calculator 47 determines the nozzle N(x) as a first nozzle, the nozzle N(x+8) as a second nozzle, a representative color value of 0 as a first color value, and a representative color value of 5 as a second color value to obtain four reference values g(m), g(n), h(m), and h(n), in accordance with memory addresses generated by the memory address generator 45. The calculator 47 then calculates an output value O according to the above formula (1).

If the calculated result according to formula (1) includes a fractional portion, the calculator 47 performs predetermined rounding to deal with the fractional portion. For example, the predetermined rounding includes rounding off, rounding down, and rounding up.

If the representative-nozzle specifying section 43 specifies only a first nozzle, the calculator 47 omits the calculations on a second nozzle in formula (1). Specifically, the calculator 47 omits the calculations on h(m) and h(n) in formula (1).

If the representative-color-value specifying section 44 specifies only a first color value, the calculator 47 omits the calculations on a second color value in formula (1). Specifically, the calculator 47 omits the calculations on (n) in formula (1).

The calculator 47 adds information indicating a nozzle N specified by the nozzle specifying section 42 to an output value, and outputs the output value to the image-forming unit 50.

The image-forming unit 50 specifies the nozzle N and color value corresponding to the output value, and ejects ink corresponding to the specified color value from the specified nozzle N.

The controller 70 of the present embodiment has functions for performing various processing operations for creating reference data D.

An example process for creating reference data D will be described.

Creation of reference data D in a single color processor 40 corresponding to a predetermined one color will be described hereinafter. Actually, however, the creation of reference data D is performed for each of the plurality of ink-jet heads 51 for the respective colors.

The controller 70 makes the image-forming unit 50 form an output image for shading correction (simply described as "an output image" hereinafter) with no processing performed by the color processor 40.

Figure 4A:
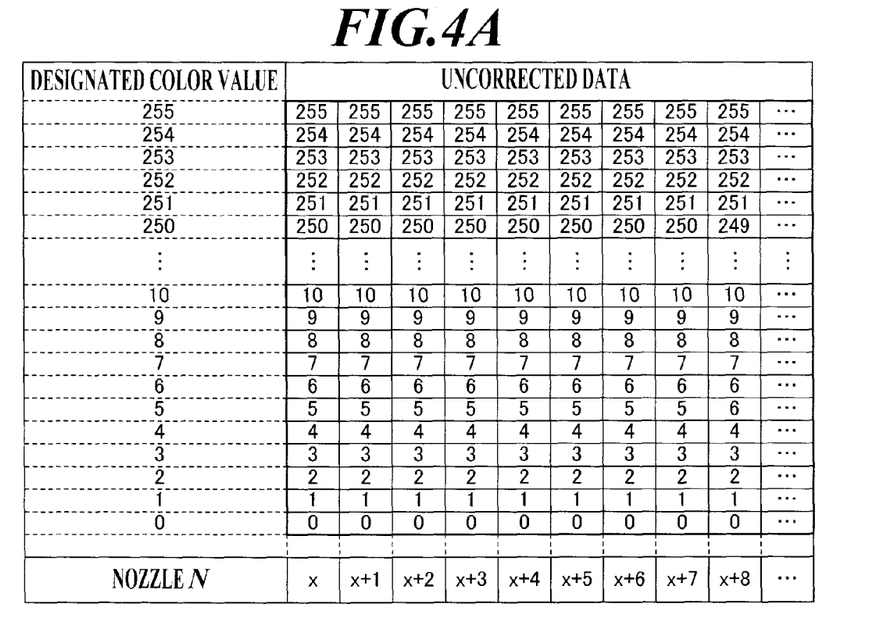
FIG. 4A is a diagram illustrating example uncorrected data.

Specifically, as shown in FIG. 4A for example, the controller 70 makes all of a predetermined number of nozzles N arranged in a predetermined direction eject ink while the controller 70 increases or decreases the color values within the range between the minimum color value and the maximum color value and serially designates color values. At the same time, the controller 70 transports a recording medium to form, on the recording medium, an image showing a density change pattern (a gradation pattern) of an output from each of the nozzles N as an output image.

The controller 70 then waits until the scanner 20 scans the output image.

Specifically, for example, a user manually sets the output image on the scanner 20 and instructs scanning of the output image set on the scanner 20 through the operation display unit 60. The scanner 20 then scans the output image and generates the image data. The controller 70 obtains the image data as uncorrected data.

Figure 4B:
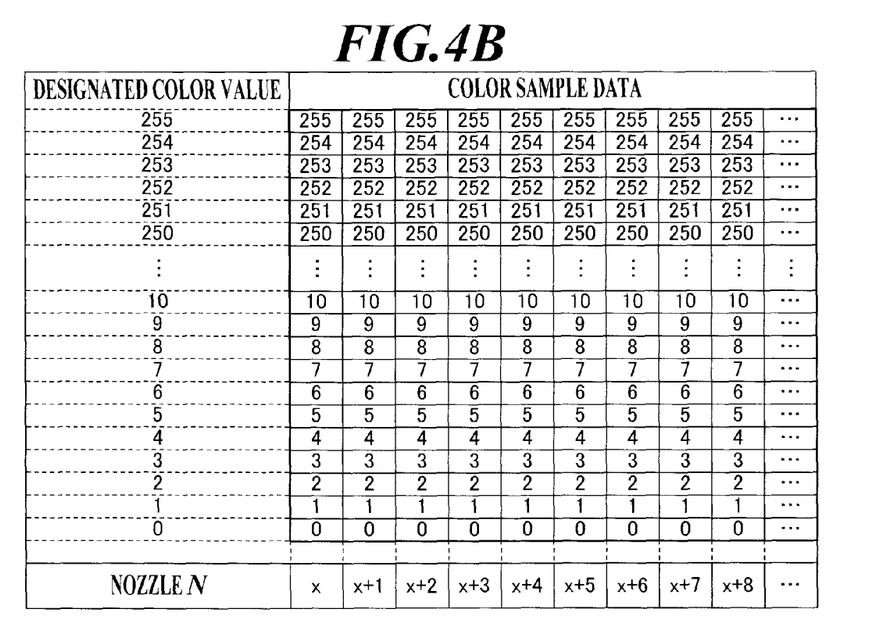
FIG. 4B is a diagram illustrating example color sample data.

The controller 70 then obtains color sample data. The color sample data is image data showing an ideal density change as a gradation pattern or data indicating the density change pattern of the image as shown in FIG. 4B, for example.

Specifically, a user manually sets a medium having an image showing a gradation pattern for color samples on the scanner 20, and instructs scanning of the medium having the image showing the gradation pattern set on the scanner 20 through the operation display unit 60. The scanner 20 then scans the medium having the image showing the gradation pattern and generates the image data.

The above procedure for obtaining color sample data is a mere example and not limitative. For example, color sample data may be stored in advance in a storage device, such as a ROM, of the controller 70.

The controller 70 then specifies the pixels corresponding to the combinations of the representative nozzles and the representative color values in each of the uncorrected data and the color sample data.

Figure 5A:
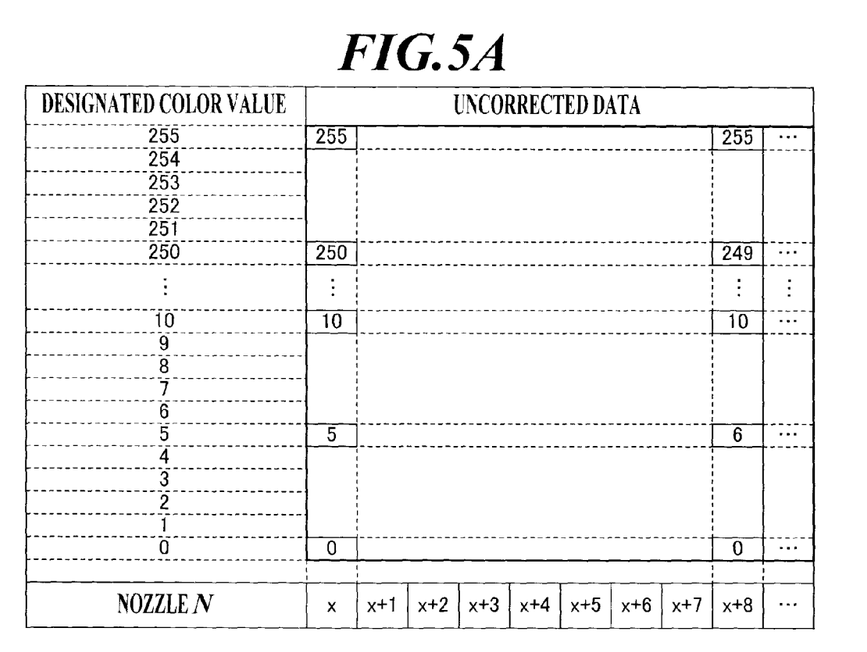
FIG. 5A is a diagram illustrating example uncorrected data having specified pixels corresponding to combinations of representative nozzles and representative color values.
Figure 5B:
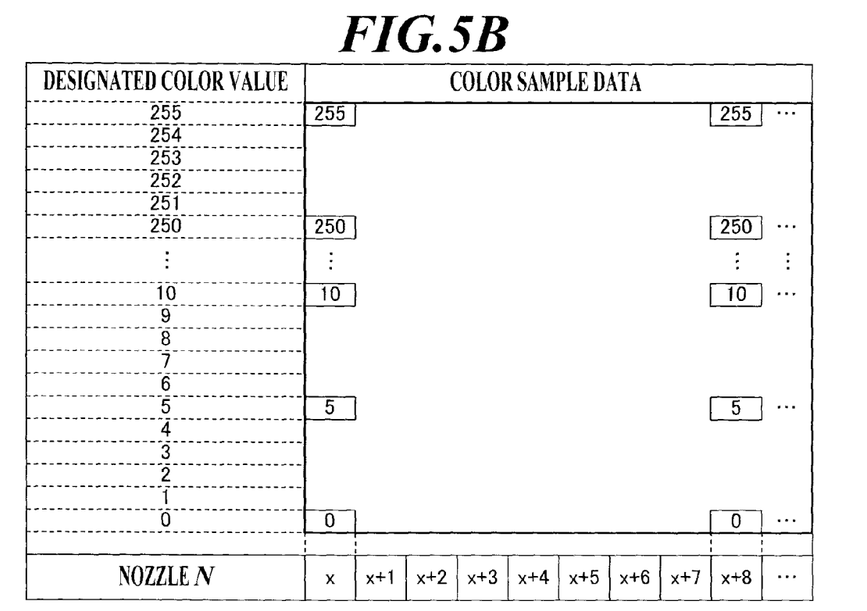
FIG. 5B is a diagram illustrating example color sample data having specified pixels corresponding to combinations of representative nozzles and representative color values.

Specifically, as shown in FIGS. 5A and 5B for example, the controller 70 specifies the pixels having color values corresponding to the representative color values in a gradation pattern formed by the representative nozzles N, from among a plurality of pixels constituting the image of each of the uncorrected data and the color sample data.

The controller 70 obtains color values of the respective specified pixels.

The controller 70 then compares the color values of the pixels corresponding to the combinations of the representative nozzles and the representative color values in the uncorrected data, and the color values of the pixels corresponding to the combinations of the representative nozzles and the representative color values in the color sample data. The controller 70 then sets values based on the results of the comparisons as reference values.

Figure 6:
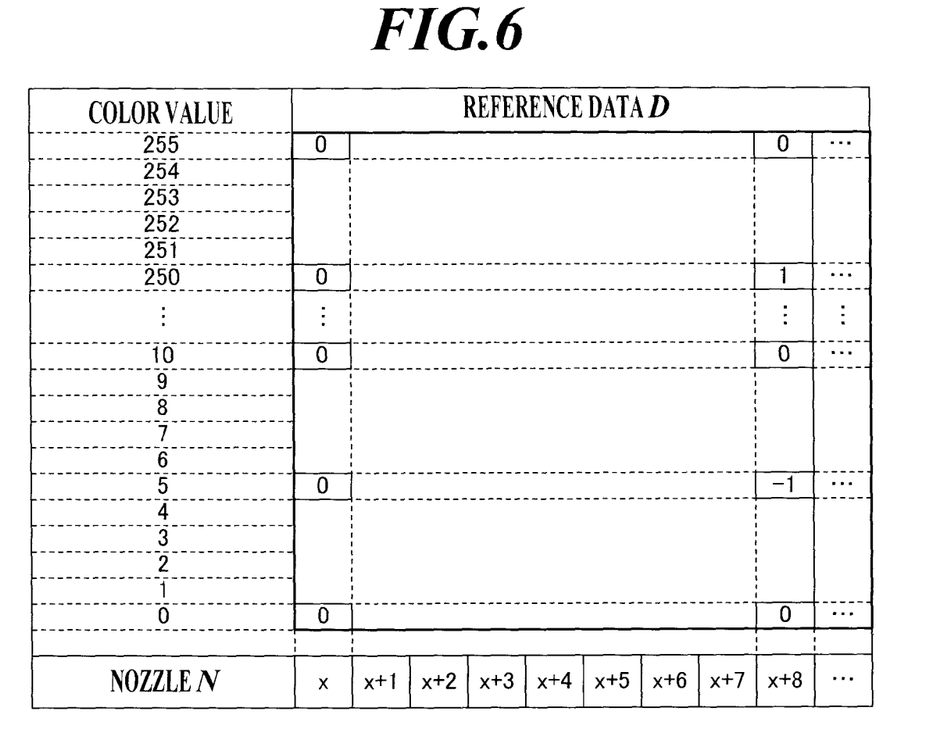
FIG. 6 is a diagram illustrating reference data created by comparison between the uncorrected data of FIG. 5A and the color sample data of FIG. 5B.

Specifically, the controller 70 sets 0 as the reference value for the pixels for which the compared color values are identical. In an example shown in FIG. 6, the color values of the pixels corresponding to the representative color values obtained from the output image of the nozzle (x) are identical with the color values of the pixels corresponding to the representative color values obtained from the color sample data. Therefore, for the nozzle (x), all the reference values are set to 0. In the same manner, for the nozzle (x+8), the reference values are set to 0 for the representative color values of 0, 10, and 255. The controller 70 sets a value indicating the difference (e.g. −1) between a color value of a pixel in the uncorrected data and a color value of a pixel in the color sample data for the pixels for which the compared color values are not identical. In the example of FIG. 6, for example, in the color values of the pixels corresponding to the representative color values obtained from the output image of the nozzle (x+8), the color value of the pixel, which corresponds to the representative color value of 5, is 6 and larger by 1 than the color value of the pixel corresponding to the representative color value obtained from the color sample data. In other words, in order to match the result of output of the nozzle (x+8) with the color sample data, a value of 1 should be deducted from the color value of the result of output. Thus, a value of −1 is set as the reference value corresponding to the representative color value of 5 in the reference values for the nozzle (x+8). In the same manner, a value of 1 is set as the reference value for the representative color value of 250 in the reference values for the nozzle (x+8).

The controller 70 compares the color values of the pixels corresponding to all the combinations of the representative nozzles and the representative color values and sets reference values. The controller 70 then makes the reference data storage section 46 store the data including these reference values as reference data D.

The above method for creating reference data D is a mere example and not limitative. Reference values in reference data D have only to be set based on the results of the comparisons between the output results corresponding to the representative color values of a predetermined color output from the representative output parts, and color samples corresponding to the representative color values of the predetermined color.

For example, in the above method for creating reference data D, all of the nozzles N eject ink to obtain the output image. Alternatively, only the representative nozzles N may eject ink. In the above method for creating reference data D, a gradation pattern including all the color values from the minimum color value to the maximum color value is formed to obtain the output image. Alternatively, the ejection may be performed for only the representative color values. Similarly, the color sample data has only to include at least the data indicating the color values as color samples corresponding to the combinations of the representative nozzles and representative color values. In the above creating method, the pixels corresponding to the combinations of the representative nozzles and representative color values are specified before the comparisons. However, the comparisons for all the pixels may be performed before specifying the pixels corresponding to the combinations of the representative nozzles and the representative color values. In the latter case, representative nozzles and representative color values can be selected based on the results of the comparisons for all the pixels.

The method for creating reference data D can be repeatedly carried out after creation of reference data D. In this case, creation of reference data D can be repeated until there is no difference between the previously-created reference data D and the latest reference data D. As a result, reference data D enabling more accurate correction will be created.

With reference to flow charts of FIGS. 7 and 8, a process flow for calculating an output value and a process flow for creating reference data D will be described, respectively, among process flows of the present embodiment.

Figure 7:
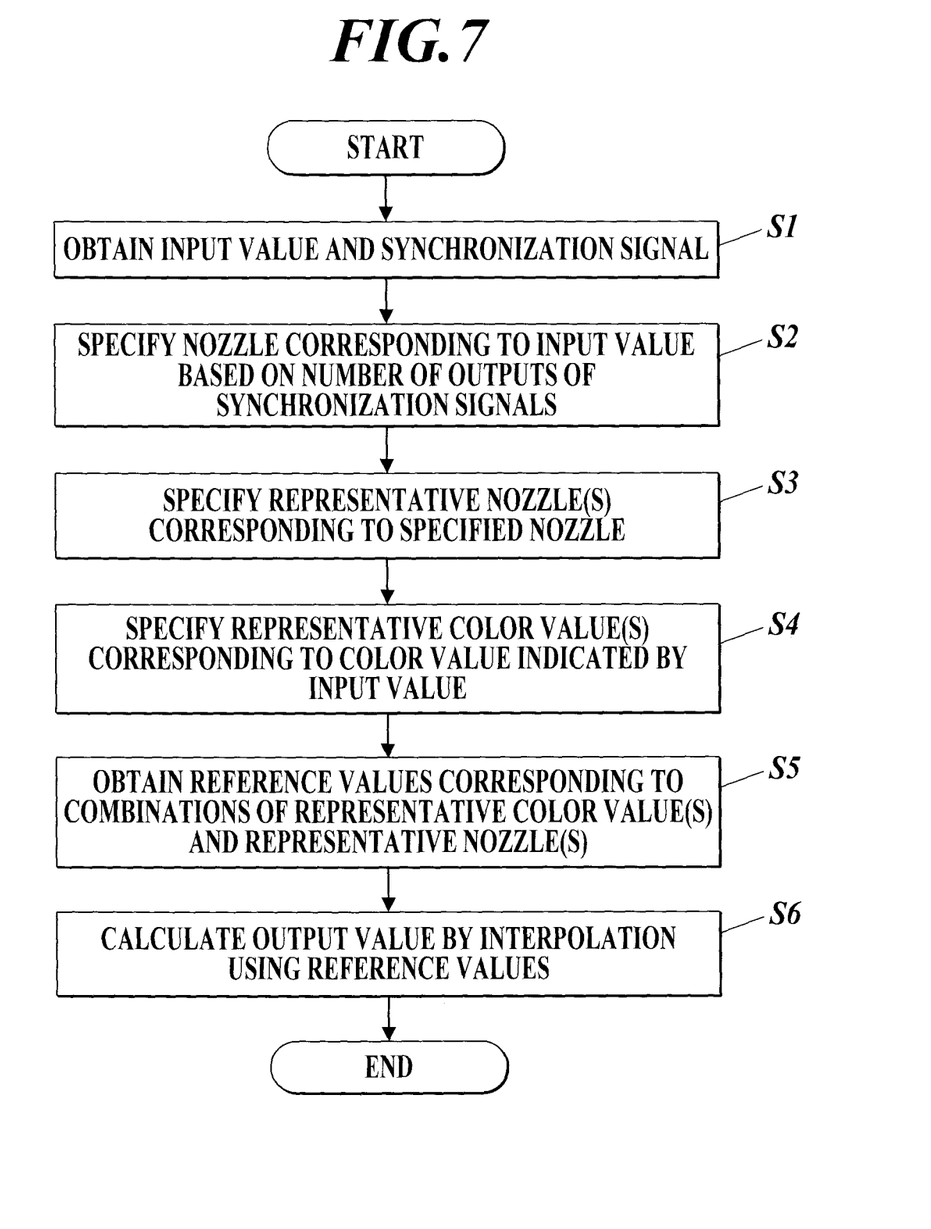
FIG. 7 is a flow chart illustrating an example process flow for calculating an output value.

FIG. 7 is a flow chart illustrating an example process flow for calculating an output value.

The generator 31 generates an input value based on a color value set for each of the plurality of pixels constituting image data, and outputs the generated input value and a synchronization signal synchronizing with the output of the input value. The color processor 40 obtains the input value and the synchronization signal output from the generator 31 (step S1).

The nozzle specifying section 42 then specifies a nozzle N corresponding to the input value from among a predetermined number of nozzles N of the ink-jet head 51 for the color corresponding to the color processor 40 including the nozzle specifying section 42, based on the number of outputs of synchronization signals counted by the counter 41 (step S2).

The representative-nozzle specifying section 43 then specifies a representative nozzle(s) corresponding to the nozzle N specified by the nozzle specifying section 42 from among the plurality of representative nozzles set in reference data D (step S3).

The representative-color-value specifying section 44 then specifies a representative color value(s) corresponding to the color value indicated by the input value from among the plurality of representative color values set in the reference data D (step S4).

The memory address generator 45 then generates memory addresses for obtaining the reference values corresponding to the combinations of the representative color value(s) and the representative nozzle(s). The calculator obtains the reference values according to the generated memory addresses (step S5).

The calculator 47 then calculates an output value corresponding to the input value by interpolation using the reference values obtained according to the memory addresses generated by the memory address generator 45 (step S6). Specifically, for example, the calculator 47 corrects the color value indicated by the input value, based on a positional relationship between the nozzle specified by the nozzle specifying section 42 and the representative nozzle(s) specified by the representative-nozzle specifying section 43, and the difference between the color value indicated by the input value and the representative color value(s) specified by the representative-color-value specifying section 44, and calculates the corrected color value as an output value O, according to formula (1).

In the calculation process described above, the representative nozzle(s) is specified before the representative color value(s) is specified. Alternatively, the representative color value(s) may be specified before the representative nozzle(s) is specified or the representative nozzle(s) and the representative color value(s) may be specified at the same time.

Figure 8:
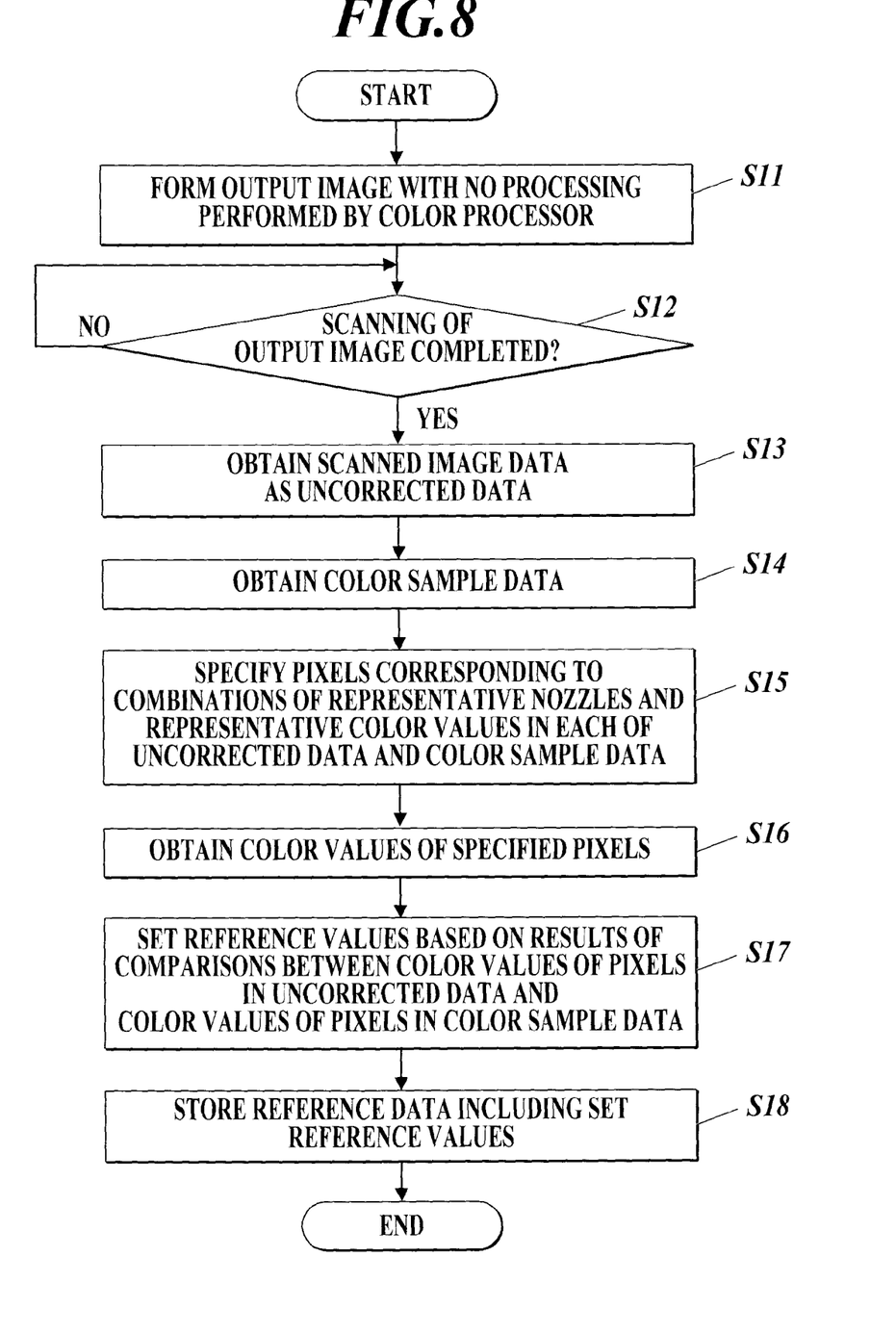
FIG. 8 is a flow chart illustrating an example process flow for creating reference data.

FIG. 8 is a flow chart illustrating an example process flow for creating reference data D.

The controller 70 makes the image-forming unit 50 form an output image with no processing performed by the color processor 40 (step S11).

The controller 70 then waits until the scanner 20 scans the output image (step S12: NO). After the scanner 20 has scanned the output image (step S12: YES), the controller 70 obtains the image data generated through the scanning of the output image by the scanner 20 as uncorrected data (step S13).

The controller 70 obtains color sample data (step S14).

The controller 70 then specifies the pixels corresponding to the combinations of the representative nozzles and the representative color values in each of the uncorrected data and the color sample data (step S15). The controller 70 also obtains the color values of the respective specified pixels (step S16).

The controller 70 then sets values, as reference values, based on the results of the comparisons between the color values of the pixels corresponding to the combinations of the representative nozzles and the representative color values in the uncorrected data, and the color values of the pixels corresponding to the combinations of the representative nozzles and the representative color values in the color sample data (step S17). The controller 70 makes the reference data storage section 46 store the data, as reference data D, including the reference values set for the pixels corresponding to all the combinations of the representative nozzles and the representative color values (step S18).

As described above, the image-forming device 1 of the present embodiment corrects a color value of a color to be output from any of three or more output parts (nozzles N) arranged in a predetermined direction based on an input value, using reference data D including reference values set for the representative output parts (the representative nozzles), the number of the representative output parts being less than the number of the three or more output parts. In addition, the image-forming device 1 corrects all the color values of a predetermined color within the range of a predetermined number of gradations from the minimum color value to the maximum color value using the reference values set for the representative color values, the number of the representative color values being less than the predetermined number of gradations of the color. Therefore, the image-forming device 1 can perform the corrections using a much smaller volume of reference data D than corrections using reference data D including reference values set for all the color values from the minimum color value to the maximum color value for all the output parts. The volume of the reference data D thus can be reduced.

As described above, when two or more nozzles N are selected periodically at an interval of 8 as representative nozzles and color values are selected periodically at an interval of 5 as representative color values, reference data D including reference values set for the respective representative color values for each of the representative nozzles has a volume which is one fortieth of the data including reference values set for all the color values for all the nozzles N. Accordingly, the present embodiment reduces the volume of the reference data D.

The plurality of reference values in the reference data D are set based on the results of the comparisons between the color output results corresponding to the representative color values output from the representative output parts (the representative nozzles) with no correction of the color values of the predetermined color performed by the color processor 40, and color samples corresponding to two or more representative colors of the predetermined color. This enables an accurate reproduction of colors corresponding to the color samples using the reference data D with a smaller volume of data.

The embodiment of the present invention disclosed herein should be considered to be a mere example and not limitative in all respects. The scope of the present invention is defined not by the above descriptions but by the claims, and is intended to cover all the modifications having equivalent meanings to those of the claims or being within the scope of the claims.

For example, in the above embodiment, each of the reference values in the reference data D indicates a difference from a color value of the color sample data, and the calculator 47 corrects the input value to calculate an output value. This is a mere example and not limitative. For example, each of the reference values in the reference data D may indicate a corrected color value itself, which should be specified to output a color value corresponding to an input value. In this case, the calculator 47 does not correct the input value but calculates the output value by bilinear interpolation using only the reference values. That is, the addition of I (I+) is omitted in formula (1).

In the above embodiment, an input value and a synchronization signal are generated separately. This is a mere example and not limitative. For example, the generator 31 may add additional information to an input value, the additional information indicating a target nozzle N for output of a color value indicated by the input value.

The image-forming device 1 of the above embodiment is a single-pass ink-jet recording device provided with the head section 52 that does not move relative to a recording medium transported by the transporting section 53. This is a mere example and not limitative. For example, the image-forming device 1 may include a guide rail for supporting the head section 52 so that the head section 52 can reciprocate in the direction orthogonal to the transporting direction of a recording medium, and a driver which moves the head section 52 along the guide rail, so that the head section 52 reciprocates to form an image. The present invention can be applied to an image-forming device 1 adopting an image forming scheme other than the ink-jet recording scheme. The present invention also can be applied to a device provided with three or more output parts arranged in a predetermined direction that performs color output (not limited to formation of images), for the purpose of shading correction of colors.

In the above embodiment, if the nozzle specified by the nozzle specifying section 42 is one of the representative nozzles, the representative-nozzle specifying section 43 omits to specify a second nozzle and the calculator 47 omits calculations on the second nozzle in formula (1). Any other manner may also be employed. For example, if the nozzle specified by the nozzle specifying section 42 is one of the representative nozzles, the representative-nozzle specifying section 43 may specify, as a first nozzle, the nozzle specified by the nozzle specifying section 42 and may specify, as a second nozzle, one of the representative nozzles nearest to the first nozzle. In this case, according to formula (1), the coefficients for calculations on the second nozzle are 0 and the reference values for the second nozzle are not considered. Thus, the same calculated result is obtained as in the above embodiment.

In the above embodiment, if the color value indicated by the input value is one of the representative color values, the representative-color-value specifying section 44 omits to specify a second color value and the calculator 47 omits calculations on the second color value in formula (1). Any other manner may also be employed. For example, if the color value indicated by the input value is one of the representative color values, the representative-color-value specifying section 44 may specify, as a first color value, the color value indicated by the input value and may specify, as a second color value, one of the representative color values closest to the first color value. In this case, according to formula (1), the coefficients for calculations on the second color value are 0 and the reference values for the second color value are not considered. Thus, the same calculated result is obtained as in the above embodiment.

In the above embodiment, the image-forming device 1 creates reference data D using components included in the image-forming device 1. This is a mere example and not limitative. For creating reference data D, the image-forming device 1 of the present embodiment has only to perform at least a process for forming an output image. Other processes may be performed by a dedicated device provided separately from the image-forming device 1, or a computer for reading and executing programs and data for creating reference data D.

The functions of the components of the color processors 40 of the above embodiment may be implemented by software processes.

INDUSTRIAL APPLICABILITY

The present invention has an applicability as a color-processing device and an image-forming device for correcting color values in image formation.

REFERENCE NUMERALS

1 image-forming device
30 image processor
31 generator (generating section)
40 color processor (color-processing device)
41 counter (first specifying section)
42 nozzle specifying section (first specifying section)
43 representative-nozzle specifying section (second specifying section)
44 representative-color-value specifying section (third specifying section)
45 memory address generator (obtaining section)
46 reference data storage section (storage section)
47 calculator (obtaining section and calculating section)
50 image-forming unit
D reference data
N nozzle (output part)

The invention claimed is:

1. A color-processing device for correcting a color value of a predetermined color to be output from any of a predetermined number of output parts based on an input value, wherein the output parts are arranged in a predetermined direction and the predetermined number is three or more, the device comprising:
 a storage section which stores reference data including a plurality of reference values set for a plurality of respective representative color values for each of a plurality of representative output parts, wherein the representative output parts are selected from the predetermined number of output parts, the number of the representative output parts is less than the predetermined number, the representative color values are selected within a range of a predetermined number of gradations from a minimum color value to a maximum color value of the predetermined color, and the number of the representative color values is less than the predetermined number of the gradations;
 a first specifying section which specifies an output part corresponding to the input value;
 a second specifying section which specifies, from among the representative output parts, a representative output part corresponding to the output part specified by the first specifying section;
 a third specifying section which specifies a representative color value corresponding to a color value indicated by the input value;
 an obtaining section which obtains, from the storage section, the reference values corresponding to combinations of the representative output part specified by the second specifying section and the representative color value specified by the third specifying section; and
 a calculating section which calculates an output value corresponding to the input value by interpolation using the reference values obtained by the obtaining section.

2. The color-processing device according to claim 1, wherein
 if the output part specified by the first specifying section is one of the representative output parts, the second specifying section specifies one representative output part, which is the output part specified by the first specifying section, and if the output part specified by the first specifying section is none of the representative output parts, the second specifying section specifies two representative output parts adjacent to the output part specified by the first specifying section; and
 if the color value indicated by the input value is one of the representative color values, the third specifying section specifies one representative color value, which is the color value indicated by the input value, and if the color value indicated by the input value is none of the representative color values, the third specifying section specifies two representative color values approximate to the color value indicated by the input value.

3. The color-processing device according to claim 1, wherein
the reference values are set based on results of comparisons between output results corresponding to the representative color values of the predetermined color output from the representative output parts, and color samples corresponding to the representative color values of the predetermined color.

4. An image-forming device comprising:
a predetermined number of nozzles for ejecting ink, the nozzles being arranged in a predetermined direction;
a generating section which generates an input value for ejecting the ink from any of the predetermined number of nozzles based on image data; and
the color-processing device according to claim 1, wherein the color-processing device corrects the color value of the predetermined color to be output from any of the predetermined number of nozzles based on the input value generated by the generating section, wherein the predetermined number of nozzles are arranged in the predetermined direction, the predetermined number is three or more, and the predetermined number of nozzles are the predetermined number of output parts.

5. A color-processing method for correcting a color value of a predetermined color to be output from any of a predetermined number of output parts based on an input value, wherein the output parts are arranged in a predetermined direction and the predetermined number is three or more, the method comprising:
creating reference data including a plurality of reference values set for a plurality of respective representative color values for each of a plurality of representative output parts, wherein the representative output parts are selected from the predetermined number of output parts, the number of the representative output parts is less than the predetermined number, the representative color values are selected within a range of a predetermined number of gradations from a minimum color value to a maximum color value of the predetermined color, and the number of the representative color values is less than the predetermined number of the gradations;
specifying an output part corresponding to the input value;
specifying, from among the representative output parts, representative output parts corresponding to the specified output part corresponding to the input value;
specifying representative color values corresponding to a color value indicated by the input value;
obtaining the reference values corresponding to combinations of the two specified representative output parts and the two specified representative color values; and
calculating an output value corresponding to the input value by interpolation using the obtained reference values.

* * * * *